(No Model.)
S. LLOYD & D. E. PIERCE.
VALVE.
No. 275,395. Patented Apr. 10, 1883.
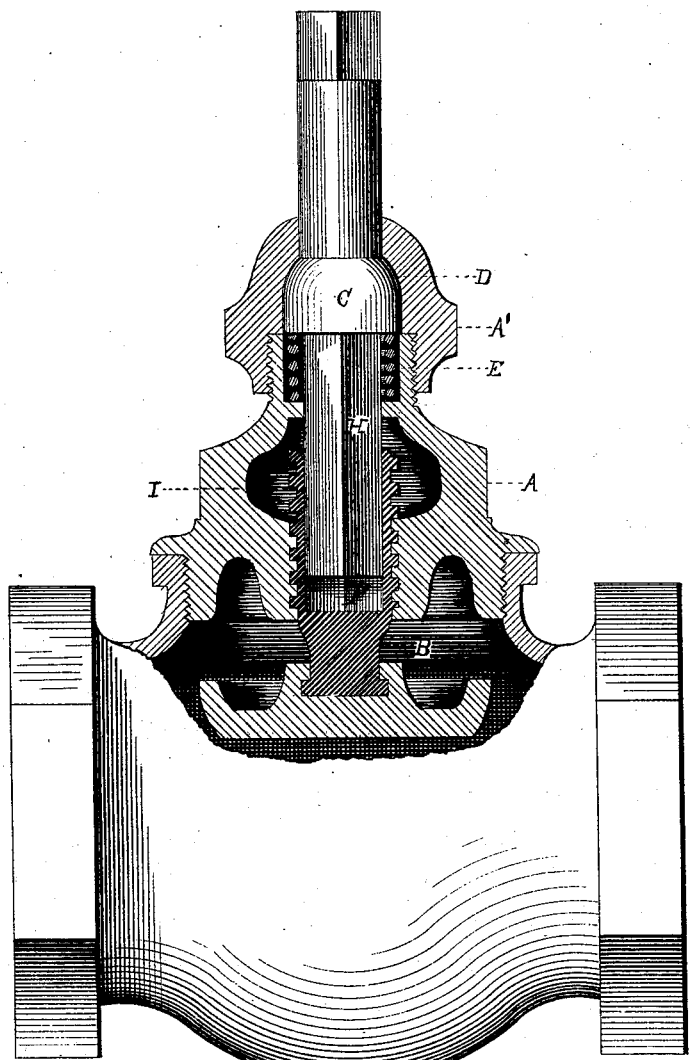

UNITED STATES PATENT OFFICE.

SETH LLOYD AND DWIGHT E. PIERCE, OF BETHLEHEM, PENNSYLVANIA.

VALVE.

SPECIFICATION forming part of Letters Patent No. 275,395, dated April 10, 1883.

Application filed July 1, 1882. (No model.)

*To all whom it may concern:*

Be it known that we, SETH LLOYD and DWIGHT E. PIERCE, both of Bethlehem, in the State of Pennsylvania, have invented a new and useful Improvement in Valves, of which the following is as true, full, and accurate a description as we are able to give, reference being had to the accompanying drawing, which form a part of this specification.

Numerous attempts have heretofore been made to construct what are called "self-packing valves"—that is, valves in which no soft or elastic packing is used to prevent the escape of the contained vapor or fluid—but, owing to the difficulty which has been found in constructing a tight valve without packing and in keeping the same tight, such valves have never gone into large or general use. The actuating valve-stems of valves of this kind have for the most part a simple movement of rotation, and they produce the motion of the valve to and from its seat without any corresponding motion in themselves by keying into a threaded stem to which the valve itself is attached. As an example of the kind of valve above referred to we would refer to that shown and described in Letters Patent to A. Hallowell, No. 65,075, dated May 28, 1867. It is to valves of this character that our invention relates and is an improvement.

The object of our invention is to provide a self-packing valve of the kind described which shall be free from the above defect, and which can be readily repaired and kept in order.

Our invention accordingly consists in making the annular enlargement or projection of metal upon the actuating valve-stem (which, as is shown in the Hallowell patent aforesaid, acts as and instead of the usual packing, and which, for convenience, we call the "stem-valve") with its bearing-surface of spherical shape, and in making its seat or bearing on the valve-casing or box of similar form, so that any slight divergence of the valve-stem from perfect alignment will not result in breaking the steam-joint, as it would do if the ordinary conical - shaped valves and seats were used; and, also, it consists of the below-described combination and arrangement of parts, whereby we are enabled to remove the stem and its enlargement or stem-valve at any time without permitting the main valve to open.

Reference being now had to the drawing, which represents a sectional view, A is the valve-stem casing or box.

A' is a cap adapted to be screwed down over the threaded neck of the box A, and having a spherical concave surface at D, adapted to form a seat for the enlargement or valve C.

B is the main valve, loosely secured at the end of the stem F, which stem is made with a square hole through its center and provided with a thread on its outside, working with a thread cut on the inside of a projection of the casing A. The valve B is elevated or depressed by turning the stem F.

H is the valve-stem, made square at its lower end, so as to fit into and turn the stem F, and provided with an enlargement or valve, C, having a bearing in the concave spherical surface of the cap A', the bearing-surface of the said enlargement or valve being also spherical. This enlargement or valve C is held against its seat D by means of the spring E. As the valve is intended to be exposed to varying temperatures the fittings of the stem H, with the cap and box A' and A and the stem F, are necessarily somewhat loose, and its perfect alignment therefore impossible when being handled and in use. The bearing-surface of the enlargement or stem-valve C, however, being spherical, permits a considerable angular movement without permitting any escape of steam.

As will at once be seen, we are enabled, by placing the spring E within the box A and beneath the enlargement or stem - valve C, to make the portion of the stem H which extends outside of the box of any desired length, and thus place the valve-wheel as far from the valve as we may desire; and, further, we are enabled by removing the cap A' to take out the stem H, with its enlargement or valve C, and repair or replace them or the spring E, the valve B being in the meantime securely held against its seat. This feature we consider of great practical importance. While we prefer to make the valve-box in two pieces—to wit, the box A and cap A'—and while this construction is necessary to enable the stem and spring to be removed without opening the main valve, it will at once be seen that this construction is not essential to the use of the spherical enlargement C and seat D, which may be used with a valve-box made of a single casting, as shown in the Hallowell patent.

Having now described our invention, what we claim as new, and desire to secure by Letters Patent, is—

1. In a self-packing valve, the combination of the stem H, provided with the spherical enlargement C, with the cap A', having a corresponding spherical bearing-surface, D, substantially as and for the purpose set forth.

2. The valve-box A and the cap A', provided with a spherical seat, D, in combination with the valve-stem H, provided with an enlargement, C, having its bearing-surface of spherical form, spring E, and means for actuating the valve, all as shown and described.

3. In a valve substantially as shown and described, the box A, having a cap, A', combined with a valve-stem, H, having an enlargement, C, and a spring, E, the construction being such that the valve-stem and spring may be removed without opening the main valve.

SETH LLOYD.
DWIGHT E. PIERCE.

Witnesses:
WM. B. ROMIG,
CHARLES WERST.